M. SMITH.

Socket for Scythe Shanks.

No. 9,637. Reissued April 5, 1881.

Witnesses;

Geo. H. Graham

Jacob Felbel

Inventor,

Miles Smith

By J. N. McIntire

Att'y.

N. PETERS PHOTO-LITHOGRAPHER, WASHINGTON, D. C.

UNITED STATES PATENT OFFICE.

MILES SMITH, OF SPRINGFIELD, VERMONT.

SOCKET FOR SCYTHE-SHANKS.

SPECIFICATION forming part of Reissued Letters Patent No. 9,637, dated April 5, 1881.

Original No. 186,218, dated January 16, 1877. Application for reissue filed March 5, 1881.

*To all whom it may concern:*

Be it known that I, MILES SMITH, of Springfield, in the county of Windsor and State of Vermont, have invented a new and useful Improvement in Adjustable Sockets for Scythe-Shank Tangs, of which the following is a specification.

Figure 1:
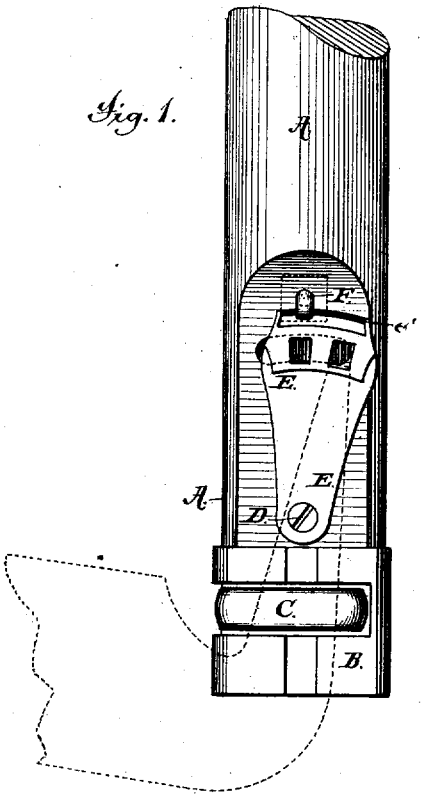
Figure 2:
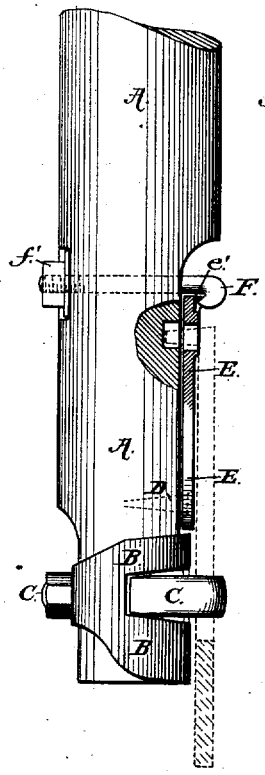

Figure 1 is a view of the under side of the lower end of a scythe-snath to which my improvement has been applied. Fig. 2 is a view of the forward side of the same, part being broken away to show the construction.

Similar letters of reference indicate corresponding parts.

My invention has for its object to provide a novel and improved means of attachment of the scythe to the snath in a manner to permit the setting in or out of the point of the scythe (to vary its hang) to suit the wishes and requirements of the mower, which means of attachment shall be simple of construction, convenient of adjustment, and capable of effecting the retention of the scythe in place firmly.

In the accompanying drawings, forming part of this specification, A represents the lower part of a scythe-snath, upon the lower end of which is arranged the ring B and the loop-bolt C in about the usual way.

To the lower side of the lower part of the snath A is pivoted, by a screw, rivet, or bolt, D, the narrow end of a plate, E. In the upper and wider end of the plate E are formed one or more holes or sockets to receive the tang of the scythe-shank.

Upon the side of the upper end of the socket-plate E, as shown, is formed a rib, $e'$, by recessing or grooving the said upper side, or by projecting the edge of the said end.

F is preferably a hook-bolt, which bolt passes through a hole in the snath A, and the hook of which overlaps the said rib $e'$. The bolt F is drawn tight to clamp the end of the socket-plate E securely to the snath A by a nut, $f'$, as shown in Fig. 2.

By the arrangement of the swinging plate E in substantially the manner shown great latitude is afforded in the adjustment of the scythe-shank, and at the same time the usual clamping devices at the lower end of the snath operate to insure the retention in place of said adjustable plate.

It will be seen that in a contrivance such as shown and described the upper end of the socket-plate E may be adjusted to change the hang of the scythe, or to set its point in or out, as may be desired, by simply loosening and retightening the nut $f'$ of the clamping bolt or device F; and it will be observed that in my improved contrivance the scythe, when it shall have been once properly hung in the snath to suit the requirements of the user, may be detached, for grinding or other purpose, and reattached without any liability of changing its hang.

Having so fully explained my invention that any person skilled in the art can make and use the same, what I claim as new, and desire to secure by Letters Patent, is—

The combination, with the snath and the ordinary scythe-clamping devices at the lower end thereof, of a swinging or adjustable plate, pivoted at its lower end, and provided at or near its upper end with one or more holes or sockets for the accommodation of the scythe-tang and a retaining-bolt, F, all substantially as and for the purposes set forth.

In testimony whereof I have hereunto set my hand this 7th day of February, 1881.

MILES SMITH.

In presence of—

CHARLES B. EDDY,

A. M. ALLBE.